Patented Aug. 9, 1932

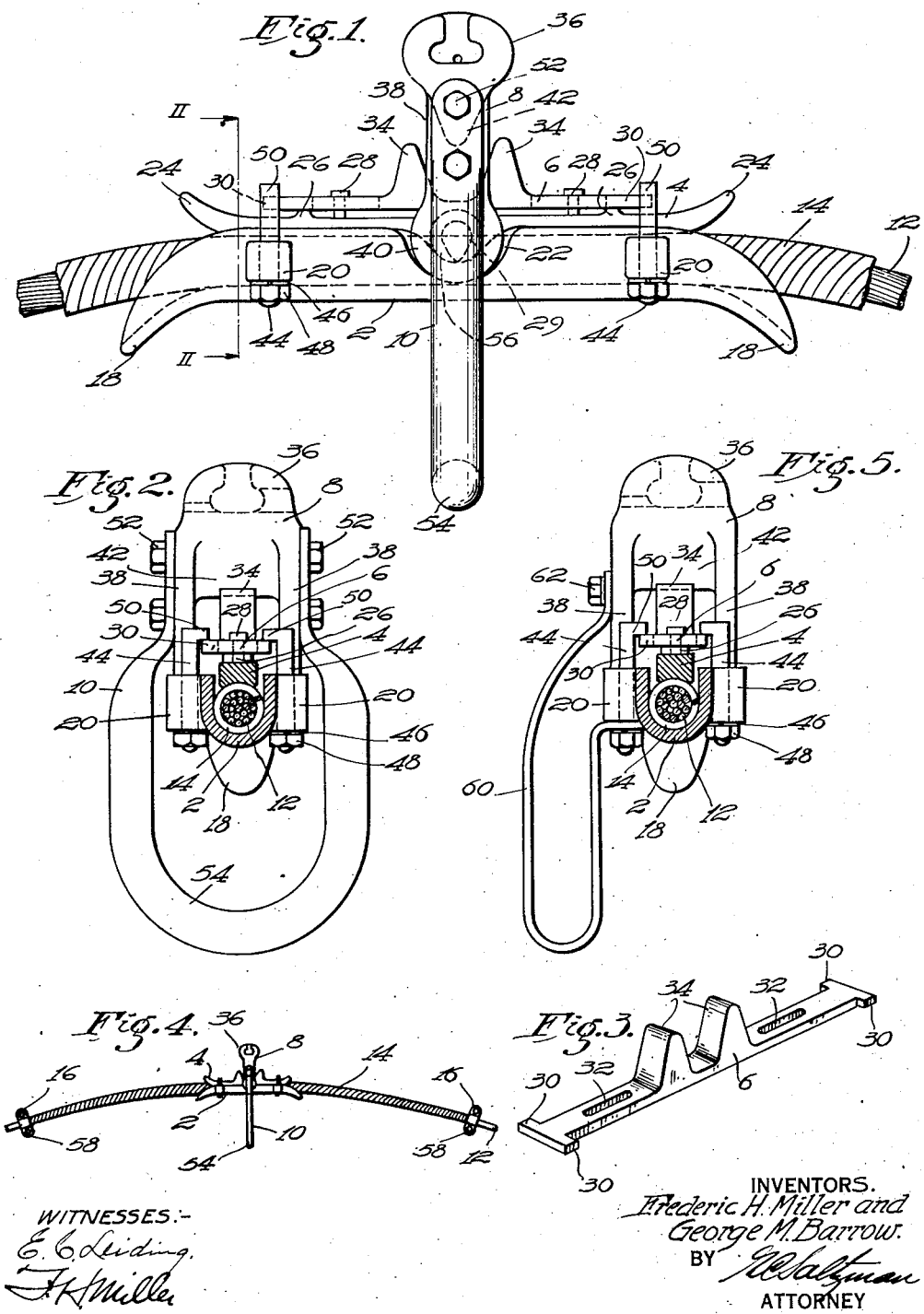

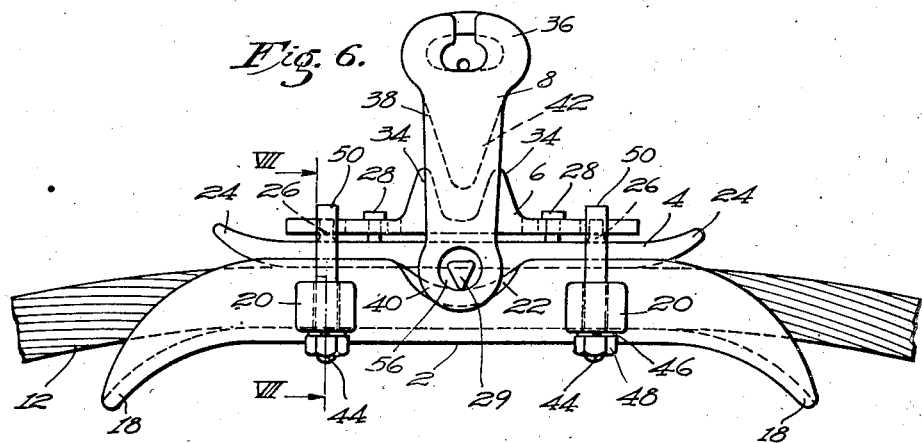
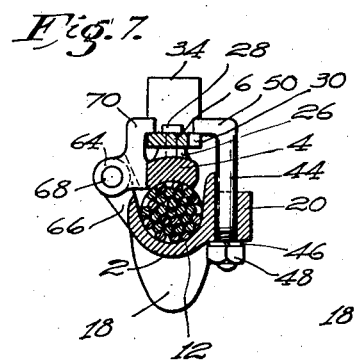
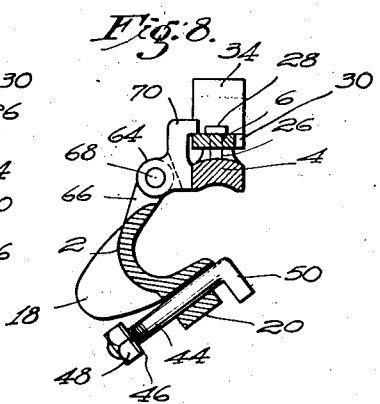
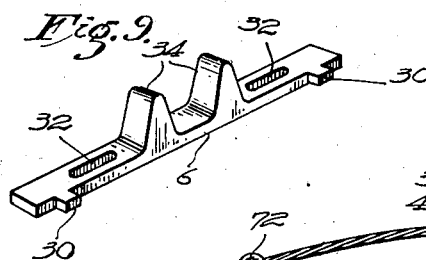
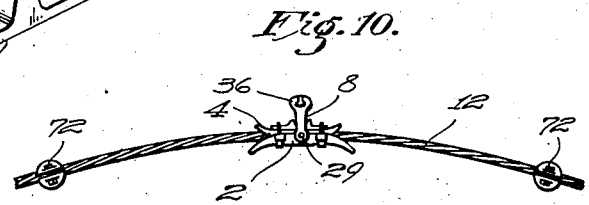

1,871,336

UNITED STATES PATENT OFFICE

FREDERIC H. MILLER, OF EDGEWOOD, AND GEORGE M. BARROW, OF DERRY, PENNSYLVANIA, ASSIGNORS TO WESTINGHOUSE ELECTRIC & MANUFACTURING COMPANY, A CORPORATION OF PENNSYLVANIA

CABLE SUPPORT

Application filed August 13, 1931. Serial No. 556,778.

Our invention relates to cable supports and particularly to means for supporting high-voltage transmission lines.

One object of our invention is to provide a device of the above-indicated character that, under predetermined conditions, shall precipitately drop the cable, rather than release it to slide longitudinally through the support as in devices heretofore suggested.

Another object of our invention is to provide a cable-release clamp device that shall permits bodies to be secured to the cable near the clamp that are too large to pass through the clamp in the direction of the cable but that shall permit the bodies to pass through the device after the release of the cable.

Another object of our invention is to provide a cable support for dropping the cable and arresting the fall of the cable after it has been dropped.

Another object of our invention is to provide a cable support that, in one form thereof, shall release the cable by dropping a portion of the support, and, in a similar form, shall arrest the fall of the dropped portion.

Another object of our invention is to provide a cable support that shall comprise hinged portions in one relative position of which the cable shall be supported and, in another position, the cable shall be released to fall from the support.

Another object of our invention is to provide a cable support that shall successively permit the cable to drop from one position thereon and slide longitudinally relative thereto while still supported thereby at another position thereon.

A further object of our invention is to provide a cable support that shall be simple and durable in construction, economical to manufacture and effective in its operation.

In high-voltage transmission-line practice, it has been the custom to tightly grip the line conductors or cables at main supports, usually in the form of wood poles, structural steel towers and the like having cross arms on which insulators are mounted.

In a cable suspension system, the insulator is in the form of a series of flexibly-connected units depending from a cross arm, and is provided with a clamp at the lower end of the series for tightly securing the cable.

In such systems, when the cable breaks, a violent torsional stress is imposed on the pole or tower, and the effect of such stress must be considered in the design of the system.

To render the system less expensive, it has heretofore been suggested that if, when the cable breaks, it is released from the clamp or clamps, nearest the break, the above-mentioned torsional strain on the tower will be eliminated and that, consequently, the tower may be of much lighter and more economical construction.

This suggestion embodies the idea of allowing the cable to slide longitudinally through the clamp, until the cable reaches a state of rest or equlibrium, when it may be repaired or restored to its original condition.

A more recent development in the cable-suspension art calls for the encasing of the cable near the clamp or support, with a metal jacket which extends from a position on the cable several feet from the clamp, at one side thereof, through the clamp, to a corresponding position at the other side of the clamp. This device, in its most simple and economical form, embodies a metal strap, as of aluminum, that is wound helically about the cable and secured at its ends by clips.

The purpose of the wound metal strap is to absorb mechanical waves or oscillations that travel along the cable, and to prevent undue bending and resultant fatigue of the cable at the clamp.

The end-securing clips project laterally from the cable and, for this reason, do not slide through a slip clamp of usual dimensions.

It has further been suggested to place damping devices at local positions on the cable, certain of which are rigidly secured and others of which are adapted to slide on the cable after engagement with the clamp when the cable slips therethrough.

Accordingly, it is our object to provide a support or clamp that shall embody the cable-release feature, and in association with which an enlargement, damping means or clip may be employed that is not capable of passing through the clamp.

In practicing our invention, we provide a support which normally holds the cable but that, when the cable tends to slip, causes it to drop precipitately or perpendicularly therefrom, instead of permitting it to slip directly.

After such action, the cable may be permitted to fall as far as it may or be arrested in its fall, as hereinafter set forth.

In the accompanying drawings:

Figure 1 is a view, in side elevation, of a device constructed in accordance with our invention;

Fig. 2 is a sectional view taken along the line II—II of Fig. 1;

Fig. 3 is a detail perspective view of an element of the device shown in Figs. 1 and 2;

Fig. 4 is a side elevational view on a reduced scale of the device as shown in Fig. 1, together with certain clamps associated therewith;

Fig. 5 is a view, similar to Fig. 2, of the invention in modified form;

Fig. 6 is a view, similar to Fig. 1, of a further modification of the invention;

Figs. 7 and 8 are views taken substantially along the line VII—VII of Fig. 6, showing the parts in cable-supporting and releasing positions, respectively;

Fig. 9 is a view similar to Fig. 3, of a corresponding element of the device illustrated in Figs. 5, 6 and 7, and Fig. 10 is a view, similar to Fig. 4, of the device of Figs. 6 to 9.

Referring to Figs. 1, 2, 3 and 4, the device comprises, in general, a cable-receiving member 2, a clamping member 4, a release bar 6, a suspension element 8, a cable arrester 10, a cable 12, a cable sheath 14 and cable-sheath clips 16, as shown in Fig. 4.

The cable-receiving or clamping member 2 is preferably in the form of a trough or channel member having flared ends 18, apertured side lugs 20 and recesses 22 in the side walls thereof.

The clamping member 4, also of slightly channel-shape, or having a bottom surface to fit the sheath 14, has flared ends 24, upstanding lugs 26 on its upper side between its ends, tapped openings in its upper side for the reception of screws 28, and side trunnions or pivot bearing portions 29 in the recesses 22.

The release bar 6, shown more clearly in Fig. 3, is in the form of a flat strap, or bar, having laterally-extending lugs 30, longitudinal slots 32 through which the screws 28 extend, and a pair of upstanding projections 34 on upper side thereof.

The suspension element or yoke 8 has a usual socket portion 36, for the reception of the pin of a cap-and-pin insulator from which it is suspended, side arms 38, pivot or rocking-bearing portions 40 at the lower ends of the arms 38 for the trunnions 29 on the clamping member 4, and a depending projection 42 positioned between the projections 34 on the slide-bar 6.

The sheath 14, preferably of aluminum strap or round wire is wound helically about the cable 12 between the clips 16, by which it is clamped to the cable. The sheath is preferably of gradually decreasing thickness or diameter from its central portion toward its ends whereby it gradually tapers toward the clips 16 and offers more and more resistance to a travelling wave in the cable from the clips toward the center of the clamp. In this manner, undue bending and fatigue of the cable opposite the flared ends 18 and 24 is prevented and less shock is transmitted to the insulators and to the tower.

Bolts 44, in the lugs 20, are held in position, as by lock washers 46 and nuts 48, and are provided with hooks or lateral projections 50 for engaging the projections 30 on the slide bar 6. When in holding position on the lugs 30, the adjacent ends of each pair of the hooks 50 are farther apart in a direction across the slide bar 6 than the width of the remainder of the slide bar 6, so that when the latter slides longitudinally in either direction a certain distance to displace the lugs 30 from positions under the hooks 50, the member 2 and the cable 12 are dropped from the remainder of the support or clamp.

The arrester 10, the use of which is optional, may desirably be in the form of a bent pipe or bar flattened at its ends at which it is secured to the side arms 38 of the yoke 8, as by screws 52, and from which it depends in the form of a relatively large loop 54 under the clamp.

The points or positions of bearing contact between the bearing portions 40 of the yoke 8 are laterally opposite the longitudinal axis of the sheathed cable in the clamp, so that ordinary waves in the cable pass through the clamp without imposing undue forces on the yoke, as is the case in clamps having their center of motions between the yoke and the body of the clamp materially above or below the center of the cable. The bearing portions 40 are provided with relatively large bearing openings 56 so that the trunnions 29 have a tendency to roll therein rather than to pivot, as in the case where the trunnions are cylindrical and have close bearing fit in the portions 40.

In operation, with the parts in normal operating positions, as indicated in Fig. 1, the cable and clamp body may pivot freely relative to the yoke for a certain distance on either side of the center of the clamp, by reason of the spaced relation of the projection 42 to the projections 34.

However, when the cable breaks at either side of the clamp, the release of weight at the other side causes the clamp and its supporting insulator to swing violently a relatively great distance to the side opposite the break, so that the projection 42 engages one of the projections 34 to move the slide bar longitudinally relative to the clamping members 2 and 4. This action, which is permitted by proper adjustment of the pin-and-slot connection 28—32 between the bar 6 and the member 4 causes the projections 30 to move from under the hooks 50 and permits the channel member 2 and the cable to drop directly from the support.

When the arrester 10 is employed, the cable falls only the distance permitted thereby and, since the loop 54 is of relatively great radius, the clips 16 may pass freely therethrough as they could not do if the clamping members 2 and 4 were released by a distance only sufficient to permit the cable to slide.

The clips 16, consisting of complementary halves of strap metal, or of other suitable construction, held by screws 58 for holding the ends of the sheath 14, are desirably of greater projection distance from the cable than would permit them to pass through the clamp.

In the other figures, corresponding parts are designated by corresponding reference characters.

In Fig. 5, the structure is the same as in Figs. 1, 2 and 3, except that the arrester 10 is omitted and a flexible cable or chain 60 is connected between a screw 62 on the yoke 8 and one of the bolts 44. In this structure, when the cable breaks and the parts are released, as above set forth, the cable falls entirely away from the clamp and the fall of channel member 2 is arrested. The arrester 10 and the flexible element 60 may be employed in the one device at the same time.

Referring to Figs. 6, 7, 8, 9 and 10, the channel member 2, instead of being held by four of the bolts 44, is held by two of such bolts at one side of the clamp and by hinges at the other side comprising portions 64 on the upper clamping member 4, portions 66 on the channel member 2 and hinge bolts 68. Also, the slide bar 6 has only two of the projections 30, both at one side thereof, and has its other side slidably mounted under hooks 70 on the upper clamping member 4.

In operation, with the parts assembled, as in Figs. 6 and 7, when the release occurs, the lower clamping or channel member 2 falls to a position, as indicated in Fig. 8, in which the cable is released. Thus, the device may operate irrespective of the presence of damper weights 72, as indicated in Fig. 10, or other elements on the cable that are too large to pass through a usual slip-release clamp, and, of course, it may be desirable, in certain cases, to merely drop the cable, instead of permitting it to slide through the clamp, regardless of whether there are projections on the cable or not.

While we have shown and described particular forms of our invention, changes may be effected therein without departing from the spirit and scope thereof, as set forth in the appended claims.

We claim as our invention:

1. A cable support comprising a cable-receiving member, a relatively movable suspension element therefor, means responsive to relative movement of said member and element for releasing the cable from the support laterally to the cable axis and means for preventing release of the cable-receiving member from the suspension element when the cable is so released.

2. A cable support comprising upper and lower cable-clamping members, a relatively movable suspension element for the upper clamping member and means for actuating said members to clamping position and responsive to relative movement of the upper clamping member and the suspension element for releasing the lower clamping member and the cable from the upper clamping member and the suspension element.

3. In combination, a cable, a support therefor surrounding the cable including a cable-receiving member and a suspension yoke, bodies on the cable at a distance from the support that are incapable of passing through the support with the cable in the direction of the latter, and means responsive to relative movement between the receiving member and the yoke for dropping the cable perpendicularly from the yoke.

4. In combination, a cable, a support therefor surrounding the cable including a cable-receiving member and a suspension yoke, bodies on the cable at a distance from the support that are incapable of passing through the support with the cable in the direction of the latter, means responsive to predetermined relative movement between the receiving member and the yoke for dropping the cable from the yoke and means carried by the support for arresting the drop of the cable and providing for the passage of said bodies beyond the support in the direction of the cable.

5. In combination, a support including a cable-receiving channel member, a suspension yoke therefor, means for holding the channel member to the yoke and responsive to relative movement between the channel member and the yoke for releasing the channel member from the yoke to drop the cable from the channel member, and means connected between the channel member and the support for limiting movement of the channel member away from the support after said release.

6. A cable support comprising cable clamping members and a relatively movable suspension element therefor, means for actuating said clamping members to clamping position and providing for movement thereof a certain distance away from each other in assembled relation to positions to release the cable, and bodies on the cable beyond the ends of the support normally incapable of passing through the support in the direction of the cable in any of said positions of the clamping members, said means being responsive to relative movement between the clamping members and the suspension element to move said clamping members relatively to positions to release the cable and pass said bodies through the support.

In testimony whereof, we have hereunto subscribed our names.

FREDERIC H. MILLER.
GEORGE M. BARROW.